United States Patent
Tomioka

(10) Patent No.: US 8,842,149 B2
(45) Date of Patent: Sep. 23, 2014

(54) OPTICAL SCANNING DEVICE WITH HEAT-INSULATING ROOM CAPABLE OF INSULATING HEAT TRANSFERRED UPWARD FROM DEVICE INTERIOR AND IMAGE FORMING APPARATUS WITH THE OPTICAL SCANNING DEVICE

(71) Applicant: KYOCERA Document Solutions, Inc., Osaka (JP)

(72) Inventor: Hiroyuki Tomioka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/928,180

(22) Filed: Jun. 26, 2013

(65) Prior Publication Data

US 2014/0002570 A1    Jan. 2, 2014

(30) Foreign Application Priority Data

Jun. 28, 2012 (JP) ................. 2012-144947

(51) Int. Cl.
| | |
|---|---|
| *B41J 15/14* | (2006.01) |
| *B41J 27/00* | (2006.01) |
| *G02B 26/12* | (2006.01) |
| *H04N 1/00* | (2006.01) |
| *G03G 15/28* | (2006.01) |
| *G02B 7/00* | (2006.01) |

(52) U.S. Cl.
CPC ............... *G03G 15/28* (2013.01); *G02B 26/12* (2013.01); *G02B 26/125* (2013.01); *H04N 1/00978* (2013.01); *G02B 7/008* (2013.01)
USPC ......................................... 347/245; 347/257

(58) Field of Classification Search
CPC ........... B41J 29/12; B41J 29/13; B41J 29/377
USPC .................. 347/231, 241–245, 256–261, 263
See application file for complete search history.

(56) References Cited

U.S. PATENT DOCUMENTS

| | | | |
|---|---|---|---|
| 7,319,475 B2 * | 1/2008 | Tomita et al. ................. | 347/243 |
| 7,760,228 B2 * | 7/2010 | Mamiya ........................ | 347/257 |

(Continued)

FOREIGN PATENT DOCUMENTS

| | | | | |
|---|---|---|---|---|
| EP | 1 481 810 A1 | 12/2004 | | |
| JP | 11044856 A | * 2/1999 | ............ | G02B 26/10 |

(Continued)

OTHER PUBLICATIONS

The Extended European Search Report issued by European Patent Office in the corresponding European patent application No. 13173836.1.

*Primary Examiner* — Hai C Pham
(74) *Attorney, Agent, or Firm* — Knobbe, Martens, Olson & Bear LLP

(57) ABSTRACT

An exposure device includes a polygon motor, an fθ lens, and a heat-insulating room. The polygon motor is driven into rotation while producing heat, which makes it likely that the temperature of a portion of the fθ lens near a housing right wall becomes lower than that of a portion of the fθ lens near a housing left wall. The exposure device further includes a recess located above the fθ lens and extended in a right-and-left direction. The heat-insulating room is formed by disposing a plate above the portion of the fθ lens near the housing right wall to cover the recess. Thus, the plate restricts upward heat release from the portion of the fθ lens near the housing right wall.

11 Claims, 10 Drawing Sheets

(56) References Cited

U.S. PATENT DOCUMENTS

| | | | |
|---|---|---|---|
| 8,027,075 B2 * | 9/2011 | Serizawa | 359/206.1 |
| 2002/0089582 A1 | 7/2002 | Chikano | |
| 2003/0226958 A1 | 12/2003 | Ohno et al. | |
| 2008/0069585 A1 | 3/2008 | Amada | |

FOREIGN PATENT DOCUMENTS

| | | | | |
|---|---|---|---|---|
| JP | 11183835 A | * | 7/1999 | G02B 26/10 |
| JP | 2006-003503 A | | 1/2006 | |
| JP | 2009-128556 A | | 6/2009 | |

* cited by examiner

OPTICAL SCANNING DEVICE WITH HEAT-INSULATING ROOM CAPABLE OF INSULATING HEAT TRANSFERRED UPWARD FROM DEVICE INTERIOR AND IMAGE FORMING APPARATUS WITH THE OPTICAL SCANNING DEVICE

INCORPORATION BY REFERENCE

This application claims priority to Japanese Patent Application No. 2012-144947 filed on Jun. 28, 2012, the entire contents of which are incorporated by reference herein.

BACKGROUND

The present disclosure relates to an optical scanning device configured to form an electrostatic latent image on an image carrier and an image forming apparatus with the optical scanning device.

An image forming apparatus includes an optical scanning device configured to form an electrostatic latent image on a photosensitive drum capable of carrying an image. An exposure device serving as the optical scanning device may include a laser diode, a lens, a polygon mirror, a polygon motor, an fθ lens, and a fold mirror all of which are contained in a housing.

Laser light emitted from the laser diode is guided through the lens to the polygon mirror. Then, the laser light incident on the polygon mirror driven into rotation by the motor is reflected and deflected by the mirror surfaces of the polygon mirror, then passes through the fθ lens, and is then reflected by the fold mirror. Thus, the laser light is guided to the drum surface of the photosensitive drum rotating in a sub-scanning direction and scans the drum surface in a main scanning direction.

With the rotation of the polygon mirror, heat generated from the polygon motor may be unevenly distributed in the housing to cause a temperature gradient in the fθ lens and thus cause unevenness in refractive index of the fθ lens. To cope with this, a thermally conductive member may be disposed between a high-temperature portion and a low-temperature portion inside the housing to make the internal temperature of the housing uniform.

Alternatively, a metallic member may be disposed between a main frame of the image forming apparatus to which the exposure device is mounted and the housing of the exposure device. The metallic member is directly mounted to the main frame and changed in shape between the high-temperature portion and the low-temperature portion in the housing to give a difference in heat dissipation performance and thereby make the internal temperature of the housing uniform.

SUMMARY

A technique further modified from the above known techniques is proposed as an aspect of the present disclosure.

Specifically, an optical scanning device according to an aspect of the present disclosure includes a housing, a laser light source, a polygon mirror, a polygon motor, an fθ lens, and a heat-insulating room.

The housing includes a first wall portion, a second wall portion intersecting with the first wall portion, and a housing top directly mounted on top of the first and second wall portions.

The laser light source is configured to emit laser light.

The polygon mirror includes a plurality of mirror surfaces and is disposed in an internal space defined by the housing. The polygon mirror is configured to be driven into rotation and deflect the laser light.

The polygon motor is configured to rotate the polygon mirror so that the plurality of mirror surfaces sequentially face the first wall portion and then face the second wall portion.

The fθ lens is disposed between the polygon motor and the second wall portion to extend in a direction perpendicular to the first wall portion and is configured to refract the laser light deflected by the polygon mirror.

The heat-insulating room is disposed in an area above a portion of the fθ lens away from the first wall portion in a direction of extension of the fθ lens and insulates heat radiated from the internal space.

An image forming apparatus according to another aspect of the present disclosure includes an image carrier, a charging section, an exposure section, and a developing section.

A toner image is formed on a surface of the image carrier.

The charging section is configured to charge the surface of the image carrier.

The exposure section is configured to expose the surface of the image carrier charged by the charging section to light to form an electrostatic latent image on the surface of the image carrier.

The developing section is configured to supply toner to the electrostatic latent image formed by the exposure section to form the toner image.

The exposure section includes:

a housing including a first wall portion, a second wall portion intersecting with the first wall portion, and a housing top directly mounted on top of the first and second wall portions;

a laser light source configured to emit laser light;

a polygon mirror disposed in an internal space defined by the housing, configured to be driven into rotation and deflect the laser light, and including a plurality of mirror surfaces;

a polygon motor being configured to rotate the polygon mirror so that the mirror surfaces sequentially face the first wall portion and then face the second wall portion;

an fθ lens disposed between the polygon motor and the second wall portion to extend in a direction perpendicular to the first wall portion and configured to refract the laser light deflected by the polygon mirror; and a heat-insulating room disposed in an area above a portion of the fθ lens away from the first wall portion in a direction of extension of the fθ lens and insulating heat radiated from the internal space.

DETAILED DESCRIPTION

Figure 1:
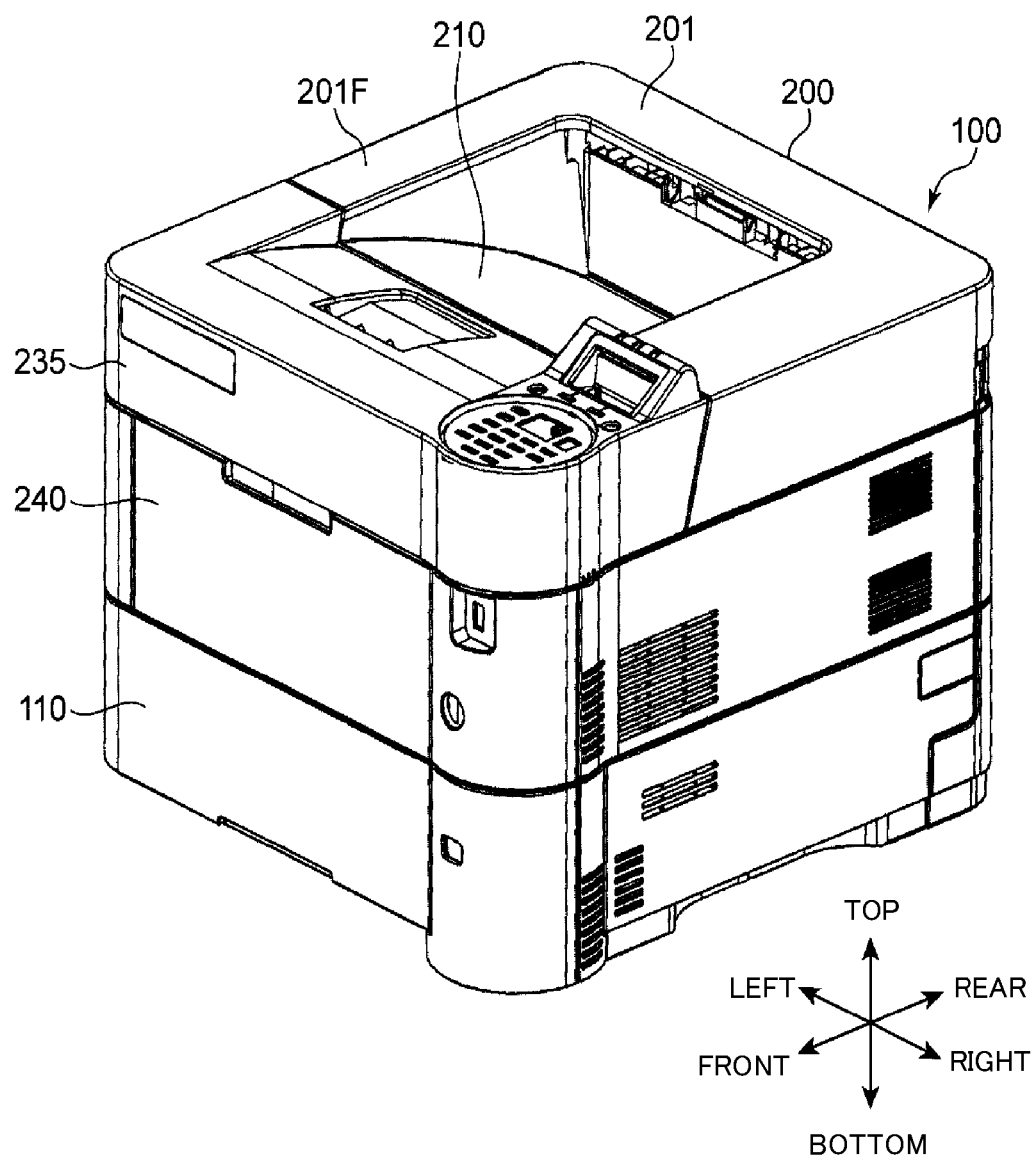
FIG. 1 is a perspective view of an image forming apparatus according to an embodiment of the present disclosure.
Figure 2:
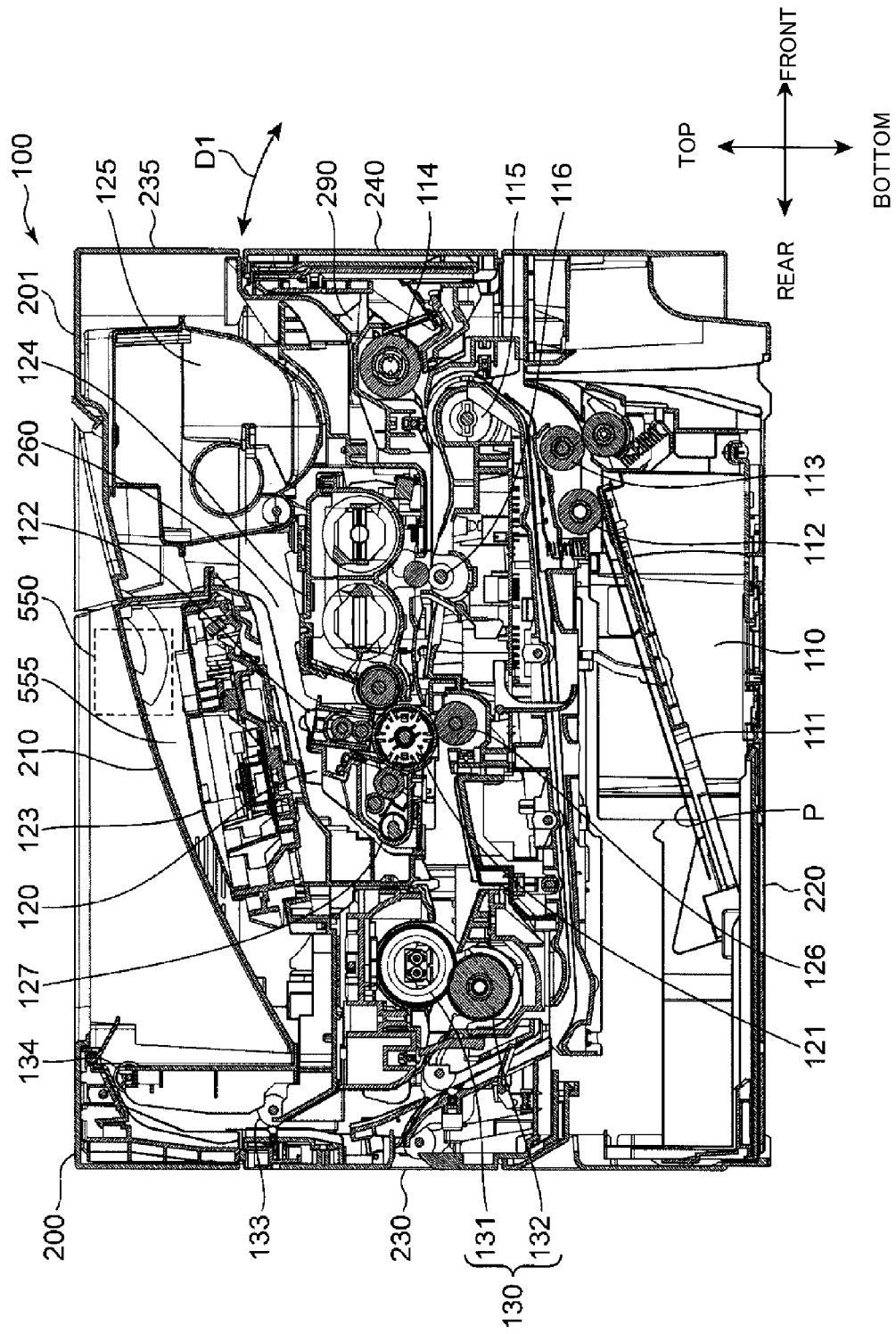
FIG. 2 is an internal cross-sectional view of the image forming apparatus according to the embodiment of the present disclosure.

Hereinafter, a description will be given of an embodiment of the present disclosure with reference to the drawings. FIG. 1 is a perspective view of a printer 100 (image forming apparatus) according to an embodiment of the present disclosure. FIG. 2 is a view schematically showing an internal structure of the printer 100 shown in FIG. 1. The printer 100 shown in FIGS. 1 and 2 is a so-called black-and-white printer. However, in other embodiments, the image forming apparatus may be a color printer, a facsimile machine, a multifunction peripheral having these functions, or another apparatus for forming a toner image on a sheet. Note that directional terms, such as "top", "bottom", "above", "below", "front", "rear", "right", and "left", used herein are simply for ease of explanation and not at all intended to limit the principle of the image forming apparatus.

The printer 100 includes a housing 200 in which various devices for forming an image on a sheet P are contained. The housing 200 includes an upper wall 201 defining a top surface of the housing 200, a bottom wall 220 defining a bottom surface of the housing 200, a back wall 230 (see FIG. 2) standing between the upper wall 201 and the bottom wall 220, and a front wall 235 standing opposite to the back wall 230. A paper output section 210 is disposed in the center of the upper wall 201. The paper output section 210 is formed of an inclined surface inclined downward from a front portion to a rear portion of the upper wall 210. The paper output section 210 is a section to which a sheet P having an image formed thereon in an image forming section 120 to be described later is to be output. A manual feed tray 240 is disposed in the front wall 235. The manual feed tray 240 is pivotable up and down (in the direction of the arrow D1 in FIG. 2) about its lower end. When the upper end of the manual-feed tray 240 is pivotally moved downward, an opening 290 formed in the housing 200 is open. The opening 290 is communicated with a main body internal space 260 (installation space) inside the housing 200. The user can access, through the opening 290, various devices housed in the main body internal space 260 in the housing 200. When the manual-feed tray 240 is pivotally moved upward, the opening 290 is closed. Thus, unnecessary access of the user to the main body internal space 260 is prevented.

The printer 100 includes a cassette 110, a pick-up roller 112, a first paper feed roller 113, a second paper feed roller 114, a conveyance roller 115, a registration roller pair 116, and an image forming section 120.

The cassette 110 is configured to contain a plurality of sheets P. The cassette 110 includes a lift plate 111 capable of supporting the sheets P. The lift plate 111 is inclined to lift up the leading edges of the sheets P.

The pick-up roller 112 is disposed above the leading edges of the sheets P lifted up by the lift plate 111. When the pick-up roller 112 rotates, the sheets P are pulled out of the cassette 110 one by one.

The first paper feed roller 113 is disposed downstream of the pick-up roller 112. The first paper feed roller 113 forwards the sheet P downstream. The second paper feed roller 114 is disposed near the pivot point of the manual feed tray 240. The second paper feed roller 114 feeds the sheet P on the manual feed tray 240 into the housing 200. The user can selectively use the sheet P contained in the cassette 110 or the sheet P placed on the manual-feed tray 240.

The conveyance roller 115 is disposed downstream of the first paper feed roller 113 and the second paper feed roller 114. The conveyance roller 115 conveys the sheet P forwarded by the first paper feed roller 113 and the second paper feed roller 114 more downstream.

The registration roller pair 116 defines the position of the sheet in a direction orthogonal to a direction of conveyance. Thus, the position of an image to be formed on the sheet P is adjusted. The registration roller pair 116 supplies the sheet P to the image forming section 120 to coincide with the timing of image formation of the image forming section 120.

The image forming section 120 includes a photosensitive drum 121, a charger 122, an exposure device 123 (optical scanning device), a developing device 124, a toner container 125, a transfer roller 126, and a cleaning device 127.

The photosensitive drum 121 has an approximately cylindrical shape. The photosensitive drum 121 is configured to form an electrostatic latent image on its peripheral surface and carry a toner image corresponding to the electrostatic latent image.

The charger 122 is configured to be given a predetermined voltage and substantially uniformly charge the peripheral surface of the photosensitive drum 121. The exposure device 123 is configured to irradiate the peripheral surface of the photosensitive drum 121 charged by the charger 122 with laser light. The laser light is emitted according to image data output from an external device (not shown), such as a personal computer, which is connected to the printer 100 to allow communication with the printer 100. As a result, an electrostatic latent image corresponding to the image data is formed on the peripheral surface of the photosensitive drum 121. The exposure device 123 will be described in detail later.

The developing device 124 is configured to supply toner to the peripheral surface of the photosensitive drum 121 on which the electrostatic latent image is formed. The toner container 125 is configured to supply toner to the developing device 124. The toner container 125 supplies toner to the developing device 124 sequentially or as needed. When the developing device 124 supplies toner to the photosensitive drum 121, the electrostatic latent image formed on the peripheral surface of the photosensitive drum 121 is developed (made visible). As a result, a toner image is formed on the peripheral surface of the photosensitive drum 121.

The transfer roller 126 is rotatably disposed in contact with the peripheral surface of the photosensitive drum 121. While the sheet P conveyed from the registration roller pair 116 passes between the photosensitive drum 121 and the transfer roller 126, the toner image formed on the peripheral surface of the photosensitive drum 121 is transferred to the sheet P.

The cleaning device 127 removes residual toner on the peripheral surface of the photosensitive drum 121 after the toner image is transferred to the sheet P. The peripheral surface of the photosensitive drum 121 cleaned up by the cleaning device 127 passes below the charger 122 again and is thereby uniformly charged. Thereafter, the above formation of a toner image is performed for the next sheet P.

The printer 100 further includes a fixing device 130 disposed downstream of the image forming section 120 in the direction of conveyance and configured to fix the toner image on the sheet P. The fixing device 130 includes: a heat roller 131 configured to melt the toner on the sheet P; and a pressure roller 132 configured to bring the sheet P into close contact with the heat roller 131. When the sheet P passes between the heat roller 131 and the pressure roller 132, the toner images is fixed on the sheet P.

The printer 100 further includes: a plurality of conveyance roller pairs 133 disposed downstream of the fixing device 130; and an output roller pair 134 disposed downstream of the conveyance roller pairs 133. The sheet P is conveyed upward by the conveyance roller pairs 133 and finally output from the housing 200 by the output roller pair 134. The sheets P output from the housing 200 are piled up on the paper output section 210.

Figure 3:
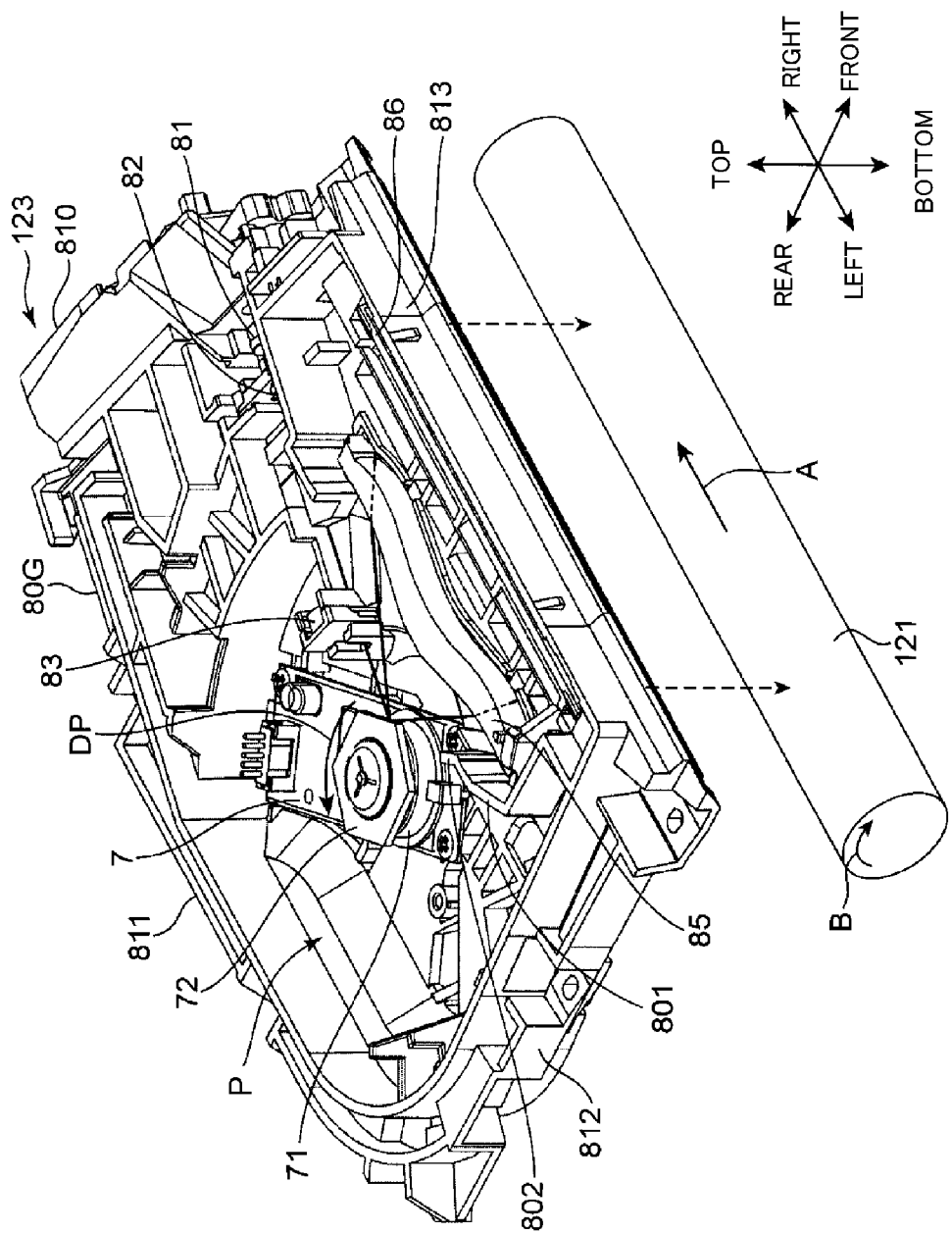
FIG. 3 is an exploded perspective view of an exposure device according to the embodiment of the present disclosure.
Figure 4:
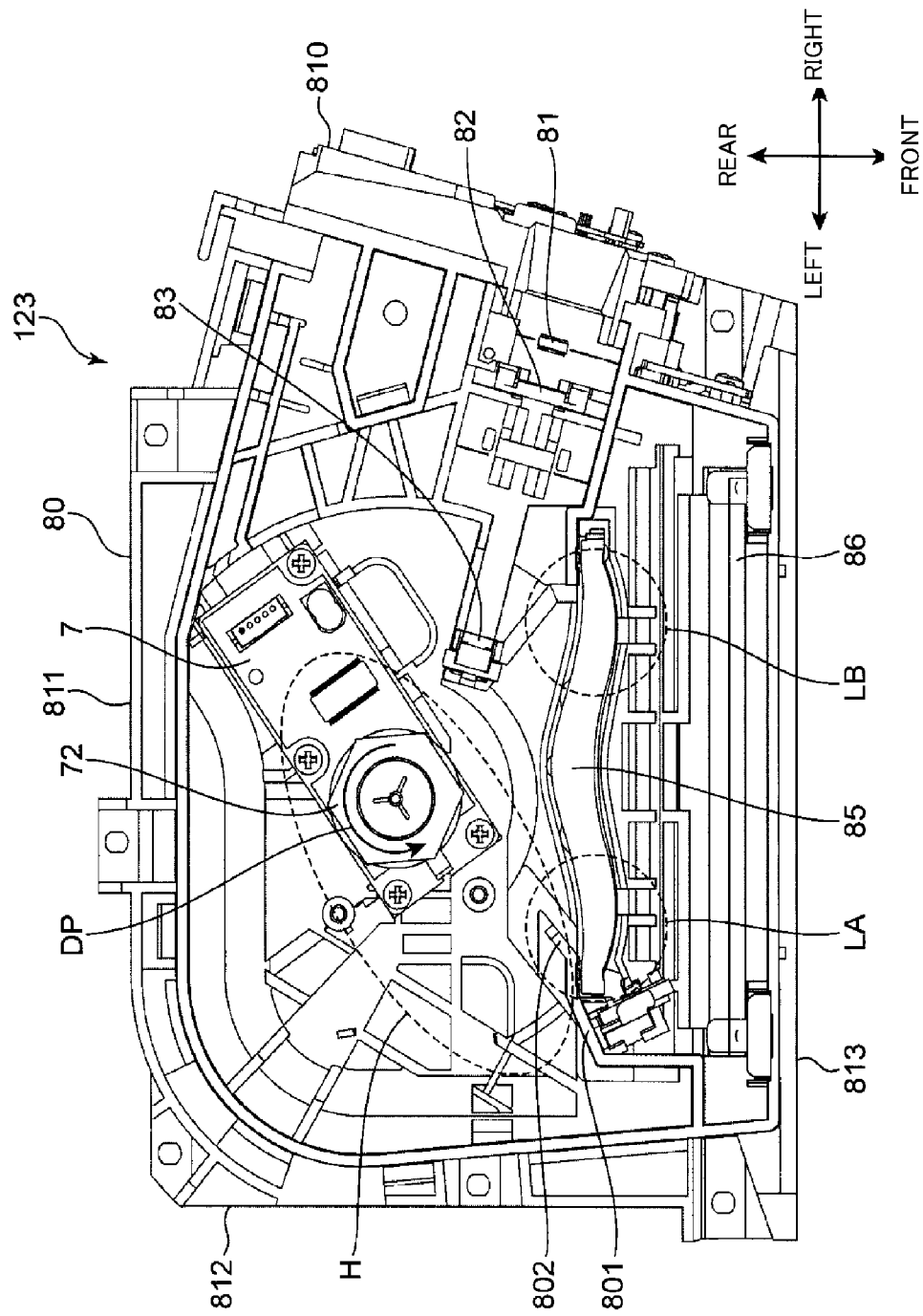
FIG. 4 is a top view of the exposure device according to the embodiment of the present disclosure.

Next, a description will be given of the structure of the exposure device 123 according to this embodiment with reference to FIGS. 3 and 4. FIG. 3 is a perspective view showing the internal structure of the exposure device 123 according to this embodiment. FIG. 4 is a top view of the exposure device 123. FIGS. 3 and 4 show a state that a housing top 80T (see FIG. 5) of the exposure device 123 is removed. The exposure device 123 includes a housing 80, a laser diode 81 (laser light source), lens elements 82, 83, a polygon motor unit 7, an fθ lens 85, and a fold mirror 86.

The housing 80 is a housing in which various elements of the exposure device 123 are contained. The housing 80 has an approximately rectangular shape in top view and a flat shape with a predetermined thickness in a vertical direction. The housing 80 includes a housing body 80G and the housing top 80T (see FIG. 5). The housing body 80G is defined on the right, rear, left, and front sides by a right wall 810, a rear wall 811, a left wall 812 (first wall portion), and a front wall 813 (second wall portion), respectively. The housing top 80T is fitted over the housing body 80G and directly mounted to the right wall 810, the rear wall 811, the left wall 812, and the front wall 813. The interior of the housing 80 is formed into an internal space S in which various optical elements are arranged.

The laser diode 81 modulates an image data signal, which is generated by and output from an image memory located outside of the figures, into laser light and emits (outputs) the laser light. The laser diode 81 is disposed in the inside of the right wall 810 of the housing 80. The laser diode 81 is electrically connected to an unshown circuit board configured to control the timing of emission of the laser light and so on. The lens elements 82, 83 are formed of, for example, a collimator lens or a prism and have the function of converting the incident laser light to collimated light.

The polygon motor unit 7 is disposed in a substantially central portion of the housing 80. The polygon motor unit 7 includes a polygon motor 71 mounted on a board and a polygon mirror 72. The polygon motor 71 is configured to input a drive current and thereby rotate the polygon mirror 72 at a predetermined rotational speed. The polygon mirror 72 is formed in a flat-plate shape of regular hexagon in plan view and includes a plurality of mirror surfaces. The polygon mirror 72 is driven into rotation in the direction of the arrow DP in FIGS. 3 and 4. In other words, the polygon motor 71 rotates the polygon mirror 72 so that the plurality of mirror surfaces of the polygon mirror 72 sequentially face the left wall 812 and then face the front wall 813. While being rotated by the polygon motor 71, the polygon mirror 72 deflects the laser light coming from the lens element 83 to direct it toward the fθ lens 85.

The fθ lens 85 is disposed forwardly of the polygon motor unit 7 along a right-and-left direction. The fθ lens 85 is disposed between the polygon motor 71 and the front wall 813 to extend in a direction perpendicular to the left wall 812. The fθ lens 85 has an approximately arched shape in top view. Particularly, the midportion of the fθ lens 85 protrudes toward the polygon mirror 72 and both ends thereof protrudes toward the fold mirror 86 (and the front wall 813). The fθ lens 85 has the function of refracting the laser light deflected by the polygon mirror 72 to allow the laser light to scan the photosensitive drum 121 at a constant speed. The fold mirror 86 is provided to reflect the laser light coming from the fθ lens 85 and guide it to the photosensitive drum 121.

The housing 80 further includes an extension 801. The extension 801 is a wall portion provided in the internal space S and extended from the inside wall surface of the left wall 812. The extension 801 partitions the corner between the left wall 812 and the front wall 813 into a portion near the left wall 812 and a portion near the front wall 813. The extension 801 is extended rightward from the inside wall surface of the left wall 812, then bent rearward, and then bent toward the polygon motor unit 7. A left end portion LA of the fθ lens 85 is located immediately on the right of the extension 801. Furthermore, a distal end portion 802 (partition) of the extension 801 is located behind the left end portion LA of the fθ lens 85 and extended toward the mirror surfaces of the polygon mirror 72. In other words, the distal end portion 802 of the extension 801 is disposed to face a surface end region of the fθ lens 85 located near the left wall 812 and facing the polygon mirror 72.

In this exposure device 123, the laser light emitted from the laser diode 81 is guided through the lens elements 82, 83 to the polygon mirror 72. The laser light incident on the rotating polygon mirror 72 is reflected and deflected by the mirror surfaces of the polygon mirror 72. Then, the laser light passes through the fθ lens 85, is reflected by the fold mirror 86, and is then guided to the drum surface of the rotating photosensitive drum 121. During this time, the photosensitive drum 121 rotates about the axis orthogonal to a predetermined scanning direction (in the sub-scanning direction, or the direction of the arrow B in FIG. 3) while the laser light horizontally scans the drum surface of the photosensitive drum 121 in the predetermined scanning direction (the main scanning direction, or the direction of the arrow A in FIG. 3).

When the polygon motor 71 is driven into rotation, heat generated from the polygon motor 71 is diffused into the housing 80 by a laminar airflow formed with the rotation of the polygon motor 71. Then, as shown by an area H in FIG. 4, the warmed air is distributed over an area extending from the polygon motor unit 7 to a corner formed between the left wall 812 and the fθ lens 85. As a result, the left end portion LA of the fθ lens 85 (a portion thereof near the left wall 812) reaches a higher temperature than a right end portion LB (a portion thereof away from the left wall 812) to cause a temperature gradient in the fθ lens 85. Thus, the left end portion LA may be thermally expanded to a greater degree than the right end portion LB, so that the fθ lens 85 may have refractive index differences in the right-and-left direction (the direction of extension) of the fθ lens 85. The refractive index differences induce distortion of the electrostatic latent image on the photosensitive drum 121, resulting in a defective image formed by the image forming apparatus 1.

Figure 5:
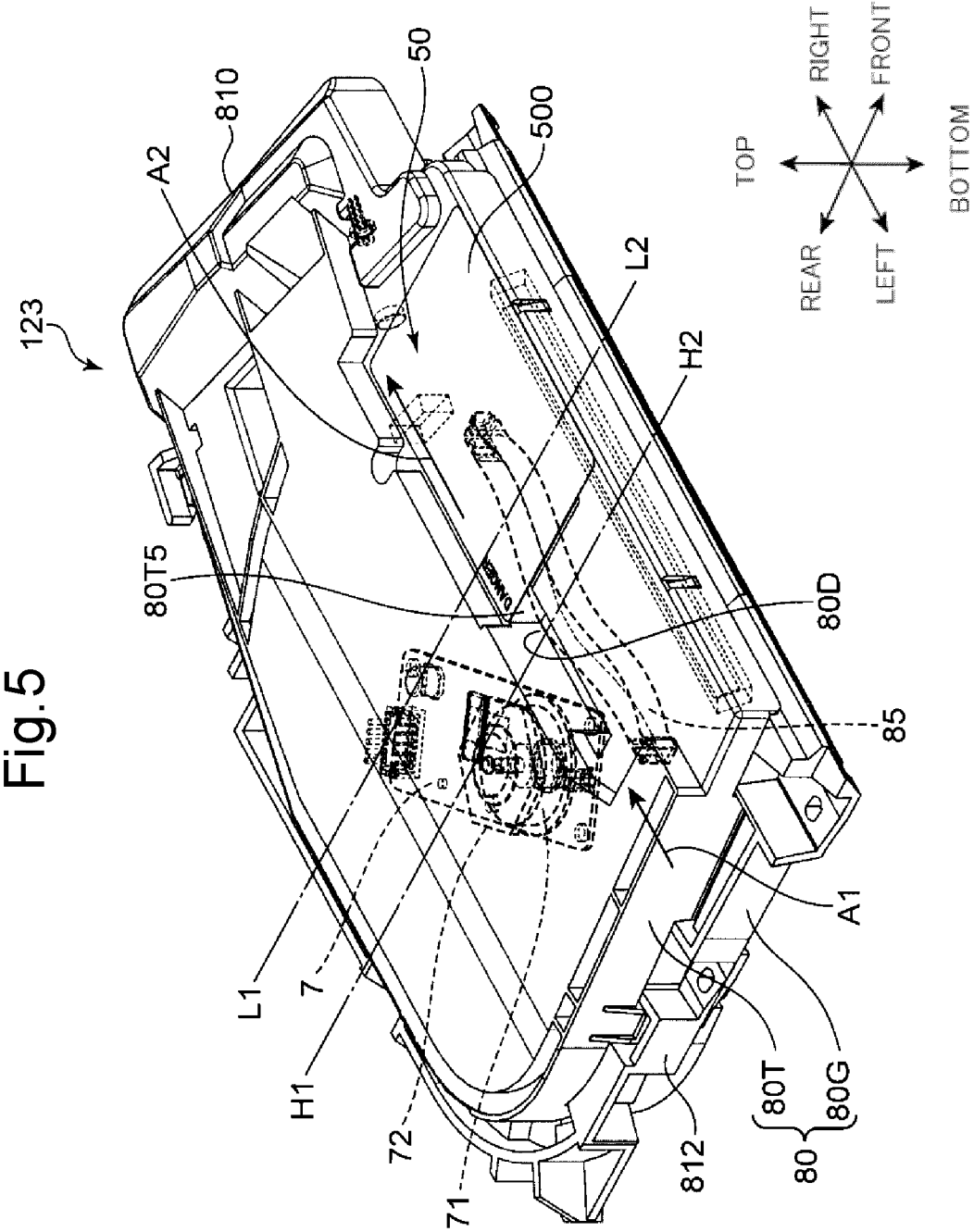
FIG. 5 is a perspective view of the exposure device according to the embodiment of the present disclosure.
Figure 6:
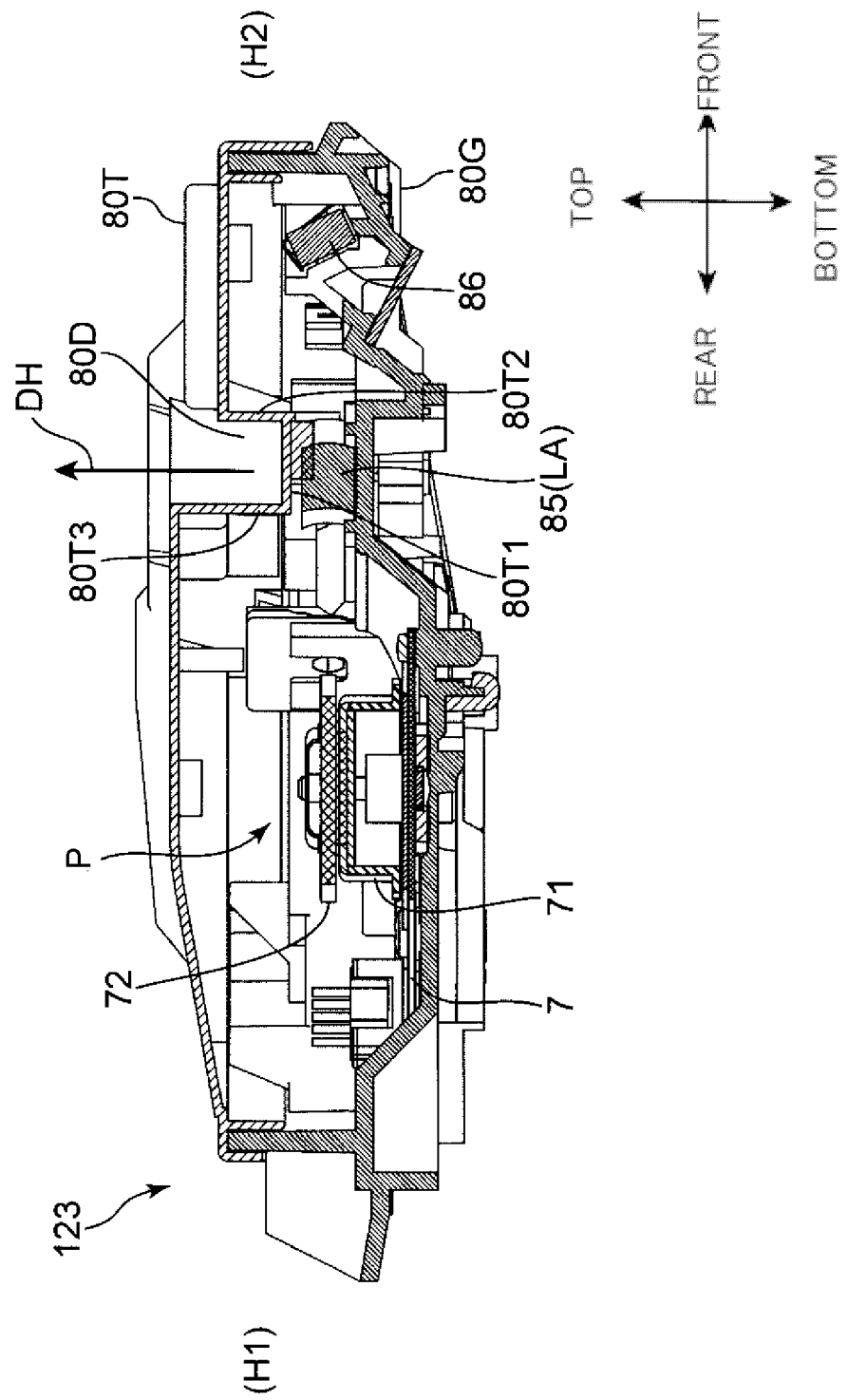
FIG. 6 is a cross-sectional view of the exposure device according to the embodiment of the present disclosure.
Figure 7:
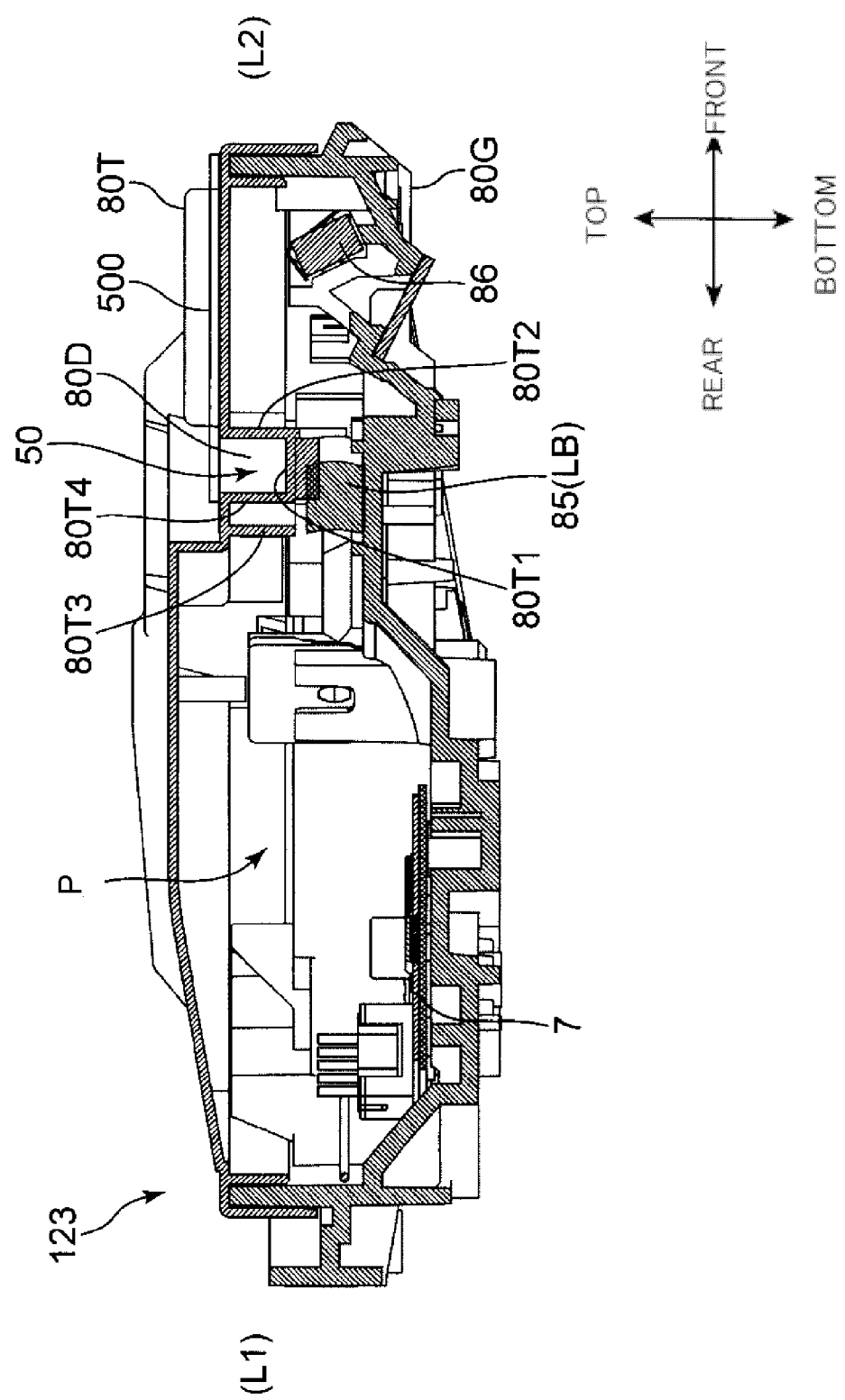
FIG. 7 is another cross-sectional view of the exposure device according to the embodiment of the present disclosure.

Even in the above case of heat diffusion, in this embodiment, the temperature gradient of the fθ lens 85 in the right-and-left direction can be appropriately reduced. FIG. 5 is a perspective view of the exposure device 123 according to this embodiment similar to, but different from FIG. 3 in that the exposure device 123 includes the housing top 80T. FIGS. 6 and 7 are cross-sectional views of the exposure device 123. FIG. 6 is a cross-sectional view taken along the line H1-H2 of FIG. 5 and FIG. 7 is a cross-sectional view taken along the line L1-L2 of FIG. 5.

The exposure device 123 includes a heat-insulating room 50. The heat-insulating room 50 is disposed above the portion of the fθ lens 85 away from the left wall 812 and insulates heat transferred from the internal space S above. The heat-insulating room 50 is defined by a recess 80D, a plate 500 (cover member), and a standing wall 80T5.

The recess 80D is a recess formed in the housing top 80T above and along the fθ lens 85. The recess 80D is disposed to cover the top of the fθ lens 85 from its left end portion LA (see FIG. 4) to its right end portion LB.

The plate 500 is a sheet material fitted to the top surface of the housing top 80T. The plate 500 covers, from above, a region of the recess 80D away from the left wall 812, i.e., the right end portion LB. In this embodiment, the plate 500 is a label attached to the top surface of the housing 80 of the exposure device 123 and indicating safety standards relating to laser light of the laser diode 81. The plate 500 indicates, for example, the laser class of the laser diode 81.

The standing wall 80T5 is a wall portion vertically extending in a midportion of the recess 80D in the right-and-left direction of the recess 80D. The standing wall 80T5 defines the left side of the heat-insulating room 50 (the side thereof near the left wall 812).

Referring to FIG. 6, the recess 80D is located above the fθ lens 85 (its left end portion LA) which will be warmed by the air accumulated in the area H (see FIG. 4). The recess 80D is defined on the front, rear, and bottom sides by a recess front wall 80T2, a recess rear wall 80T3, and a recess bottom wall 80T1, respectively. The heat transferred from the high-temperature fθ lens 85 through the recess bottom wall 80T1 into the recess 80D is released as an upward airflow to an upper region of the exposure device 123. Specifically, since the plate 500 does not cover a region of the recess 80D located above the left end portion LA of the fθ lens 85, the heat transferred into the recess 80 is released to the upper region of the exposure device 123.

On the other hand, referring to FIG. 7, the heat-insulating room 50 is disposed above the fθ lens 85 (its right end portion LB). An air layer is formed inside the heat-insulating room 50. The heat-insulating room 50 is defined by the recess 80D and the plate 500 disposed above the recess 80D. The housing top 80T includes a recess inner wall 80T4 above the right end portion LB of the fθ lens 85. Thus, the recess 80D is defined by the recess inner wall 80T4, the recess bottom wall 80T1, and the recess front wall 80T2. The housing top 80T may have a configuration without the recess inner wall 80T4. In other words, also in FIG. 7 (the right end portion LB) like FIG. 6, the recess 80D may be defined by the recess rear wall 80T3, the recess bottom wall 80T1, and the recess front wall 80T2. In this case, the plate 500 is extended from the top of the recess front wall 80T2 to the top of the recess rear wall 80T3.

The right end portion LB of the fθ lens 85 is slightly warmed by heat transfer from the left end portion LA and heat transferred from the internal space S. Then, the heat is transferred from the right end portion LB of the fθ lens 85 to the recess bottom wall 80T1. However, the heat is insulated by the heat-insulating room 50 and is therefore less likely to be released to the upper region of the exposure device 123. Therefore, the amount of heat transferred from the fθ lens 85 to the recess bottom wall 80T1 can be reduced to reduce the temperature drop of the fθ lens 85 (its right end portion LB). When the heat-insulating room 50 is disposed in contact with the top surface of the fθ lens 85, the above heat insulating effect can be further ensured to provide a uniform temperature inside the housing 80. For example, the recess bottom wall 80T1 is preferably disposed in contact with the top surface of the fθ lens 85. Furthermore, in this embodiment, the standing wall 80T5 defines the left side of the heat-insulating room 50. Thus, the hermeticity of the interior of the heat-insulating room 50 is increased to enhance the heat insulating effect of the heat-insulating room 50. In other words, since the standing wall 80T5 separates the region of the recess 80D located above the left end portion LA of the fθ lens 85 from the region of the recess 80D located above the right end portion LB of the fθ lens 85, the heat transferred to the region of the recess 80D located above the left end portion LA can be prevented from transferring toward the region (heat-insulating room 50) of the recess 80D located above the right end portion LB.

As described previously, the housing 80 includes the extension 801 provided in the internal space S and extended from the inside wall surface of the left wall 812. Furthermore, the distal end portion 802 of the extension 801 is located behind the left end portion LA of the fθ lens 85 and extended toward the mirror surfaces of the polygon mirror 72. Therefore, it can be prevented that the warm air accumulated in the area H comes into contact with the left end portion LA of the fθ lens 85. Thus, the temperature rise of the left end portion LA of the fθ lens 85 can be reduced to further reduce the temperature gradient of the fθ lens 85 in the direction of extension.

Furthermore, in this embodiment, the main body internal space 260 in which the exposure device 123 is mounted has a feature. Specifically, referring to FIGS. 1 and 2, the printer 100 further includes a fan 550 (see FIG. 2) as the airflow generating device and an air passage 555 as the cooling air passage.

The fan 550 is disposed in the inside of an upper wall left side portion 201F (see FIG. 1) of the upper wall 201 located on the left of the paper output section 210. An unshown air intake is formed in the outside wall of the housing 200 to face the fan 550. The fan 550 is connected to an unshown motor and can be driven into rotation by the motor. The fan 550 allows airflow to enter the main body internal space 260 from the outside of the housing 200.

The air passage 555 guides the airflow, which has been taken in by the fan 550, along the housing top 80T of the exposure device 123. The air passage 555 is defined by the bottom surface of the paper output section 210 and the top surface (housing top 80T) of the exposure device 123. The airflow taken in the main body internal space 260 by the fan 550 flows through the air passage 555 along the housing top 80T from the left wall 812 toward the right wall 810 (see the arrows A1 and A2 in FIG. 5). During this flow, the airflow passes by a portion of the housing top 80T located above the portion of the fθ lens 85 near the left wall 812. As a result, the airflow promotes the heat release from the portion of the fθ lens 85 near the left wall 812. Subsequently, the airflow passes above the heat-insulating room 50. Therefore, the heat taken from above the portion of the fθ lens 85 near the left wall 812 can be supplied to the heat-insulating room 50. Thus, the temperature gradient of the fθ lens 85 in the direction of extension can be further reduced.

As described thus far, in this embodiment, heat generated from the polygon motor 71 accumulates in the area H (see FIG. 4) to warm the portion of the fθ lens 85 near the left wall 812. As a result, a temperature gradient occurs between the portion (left end portion LA) of the fθ lens 85 near the left wall 812 and the portion (right end portion LB) thereof away from the left wall 812. The temperature gradient may induce thermal expansion differences among portions of the fθ lens 85, so that the fθ lens 85 may have refractive index differences in the direction of extension of the fθ lens 85. To cope with this, in the structure of this embodiment, the heat-insulating room 50 insulating heat radiated from the internal space S is disposed above the portion of the fθ lens 85 away from the left wall 812. Therefore, in an area around the portion of the fθ lens 85 located away from the left wall 812 and likely to have a lower temperature than the portion thereof near the left wall 812, heat release from inside to outside of the exposure device 123 can be restricted. On the other hand, in an area around the portion of the fθ lens 85 located near the left wall 812 and likely to have a higher temperature, heat release from inside to outside of the exposure device 123 is not restricted because of absence of the heat-insulating room above this portion of the fθ lens. Thus, the occurrence of a temperature gradient of the fθ lens 85 in the direction of extension thereof can be reduced.

Furthermore, in the above embodiment, the heat-insulating room 50 is defined, in a portion of the housing top 80T located above the fθ lens 85, by the recess 80D formed along the fθ lens 85 and the plate 500 covering the region of the recess 80D away from the left wall 812. Therefore, part of the heat-insulating room 50 is defined by a simple structure formed of the recess 80D formed in the housing top 80T and the plate 500. Thus, the temperature gradient of the fθ lens 85 in the direction of extension can be reduced, which eliminates the need to provide an expensive thermally conductive member in the exposure device 123. Hence, as compared to the case where the thermally conductive member is provided, the exposure device 123 can be reduced in cost.

Moreover, in the above embodiment, the heat-insulating room 50 is further defined by the standing wall 80T5 directly connected to the recess 80D and the plate 500 and terminating the heat-insulating room 50 at the end near the left wall 812. Therefore, the side of the heat-insulating room 50 near the left wall 812 can be closed to increase the hermeticity of the heat-insulating room 50.

Furthermore, in the above embodiment, the plate 500 is a label indicating safety standards relating to laser light of the laser diode 81. Therefore, the label indicating safety standards relating to laser light of the laser diode 81 can be used also as the plate 500.

Moreover, the printer 100 of the above embodiment includes: the fan 550 allowing airflow to enter the main body internal space 260 in the housing 200; and the air passage 555 configured to guide the airflow taken in the main body internal space 260 along the housing top 80T. Thus, the airflow taken in the main body internal space 260 by the fan 550 is guided to a portion of the housing top 80T located above the portion of the fθ lens 85 near the left wall 812. As a result, heat release from the portion of the fθ lens 85 located near the left wall 812 and likely to have a higher temperature is promoted. Hence, the temperature gradient of the fθ lens 85 in the direction of extension can be further reduced.

Furthermore, in the above embodiment, the air passage 555 guides the airflow from the left wall 812 toward the heat-insulating room 50. Thus, after the airflow is guided to the portion of the housing top 80T located above the portion of the fθ lens 85 near the left wall 812, it is brought above the heat-insulating room 50. Therefore, the heat taken from above the portion of the fθ lens 85 near the left wall 812 can be supplied to the heat-insulating room 50, so that, in an area around the portion of the fθ lens 85 located away from the left wall 812 and likely to have a lower temperature than the portion thereof near the left wall 812, heat release from inside to outside of the exposure device 123 can be further restricted. As a result, the temperature gradient of the fθ lens 85 in the direction of extension can be further reduced.

Although the exposure device 123 according to the embodiment of the present disclosure and the printer 100 (image forming apparatus) with the same have been described thus far, the present disclosure is not limited to them and can take, for example, the following modified embodiments.

(1) Although the above embodiment has described an aspect in which the plate 500 is a label indicating safety standards relating to laser light of the laser diode 81, the present disclosure is not limited to this. The plate 500 may be a plate exclusively for defining the top side of the heat-insulating room 50. In this case, materials that can be used for the plate 500 include a porous elastic material and a resin-made sheet material. Particularly if a porous elastic material is used as the plate 500, heat accumulated in the heat-insulating room 50 can be released little by little. Therefore, it can be prevented that heat is excessively accumulated in the heat-insulating room 50.

Figure 8:
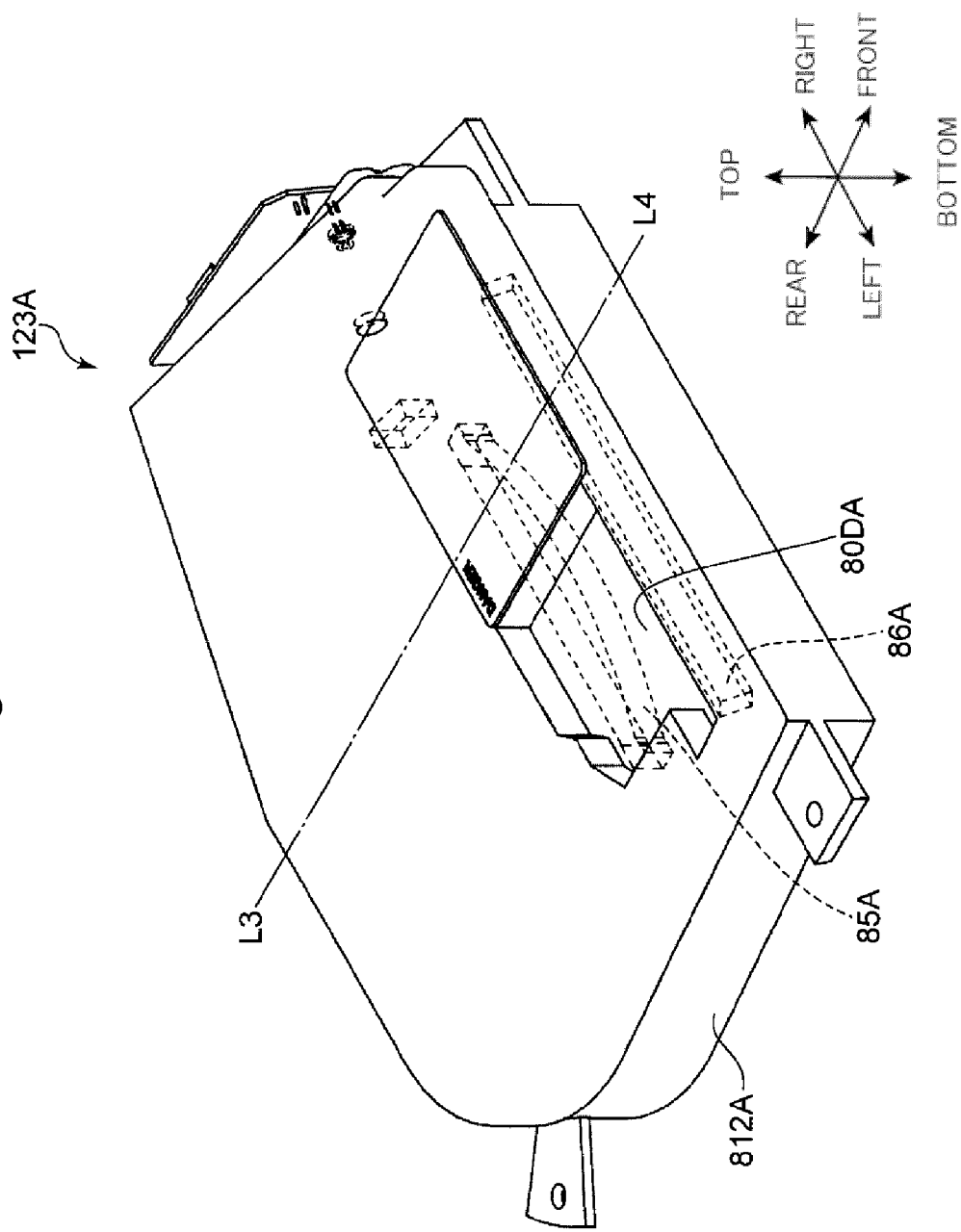
FIG. 8 is a perspective view of an exposure device according to another embodiment of the present disclosure.
Figure 9:
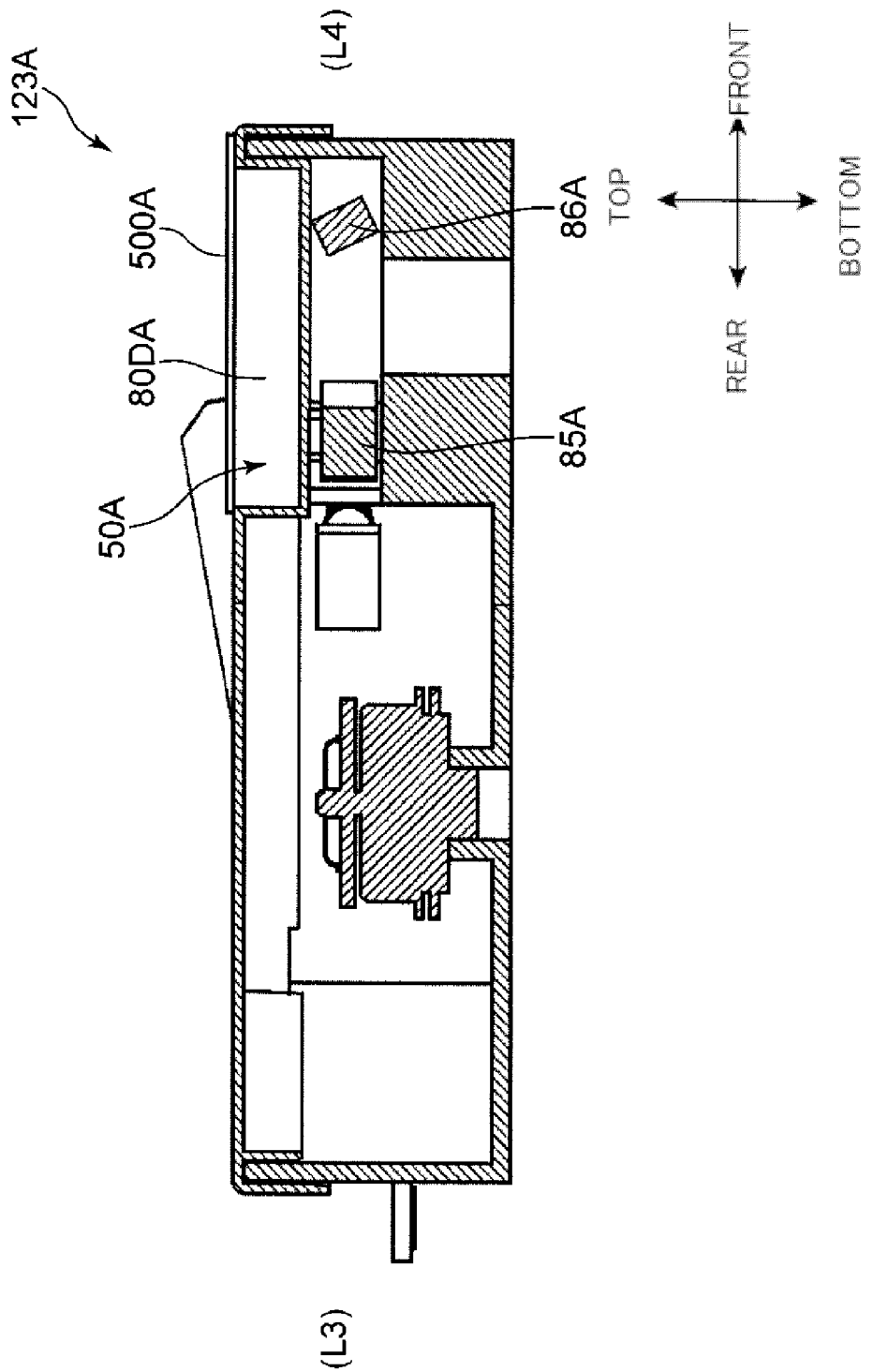
FIG. 9 is a cross-sectional view of the exposure device according to the embodiment of FIG. 8.
Figure 10:
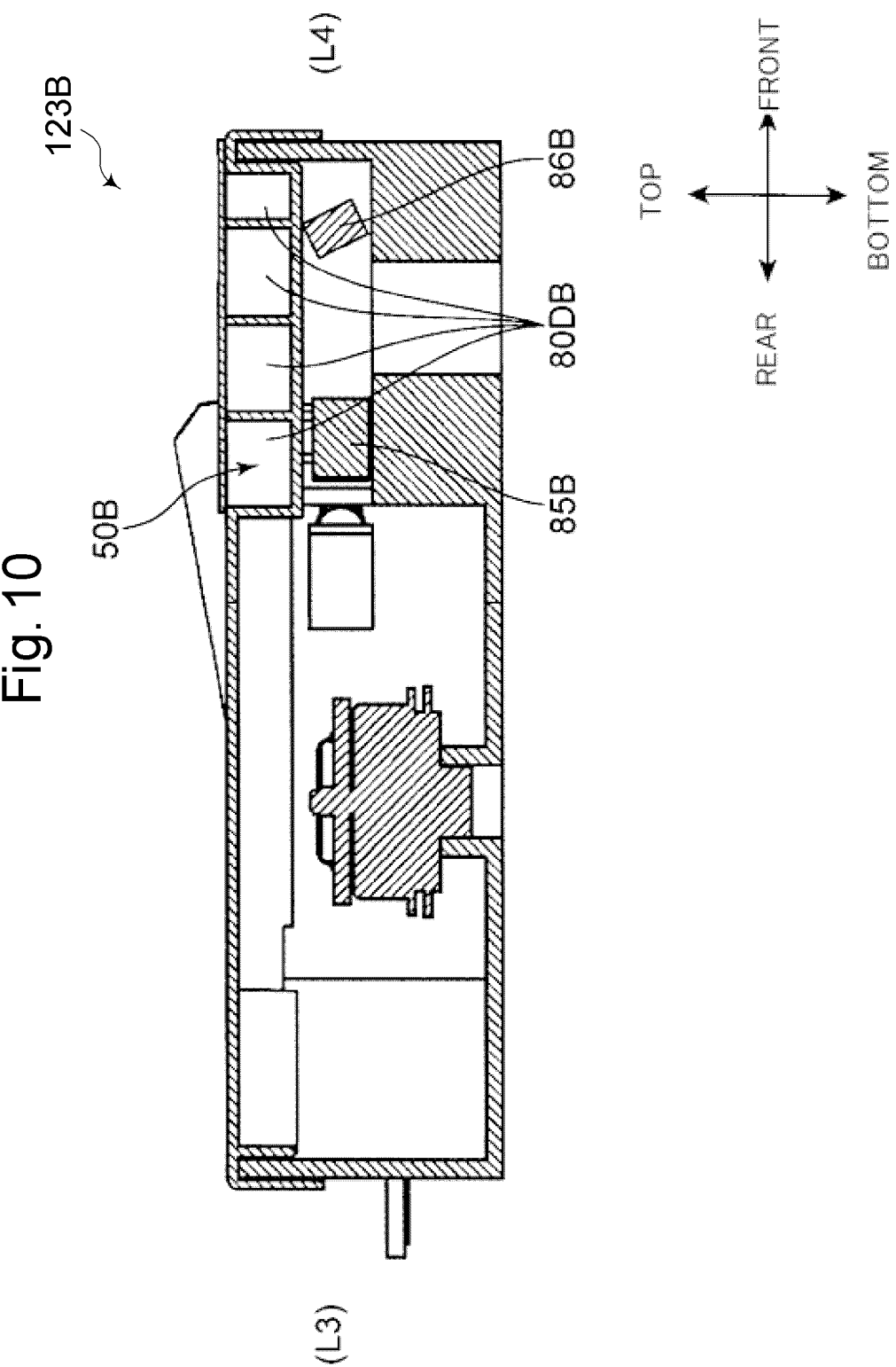
FIG. 10 is a cross-sectional view of an exposure device according to still another embodiment of the present disclosure.

(2) Although the above embodiment has described an aspect in which the recess 80D is formed in the housing top 80T above and along the fθ lens 85, the present disclosure is not limited to this. FIG. 8 is a perspective view of an exposure device 123A according to a modified embodiment of the present disclosure. FIG. 9 is cross-sectional views of different heat-insulating rooms 50A of different exposure devices 123A. FIG. 10 is cross-sectional views of different heat-insulating rooms 50B of different exposure devices 123B. As shown in FIGS. 8 and 9, a recess 80DA may be formed above and across both of an fθ lens 85A and a fold mirror 86A. Also in this case, a plate 500A is disposed above a region of the recess 80DA corresponding to a portion of the fθ lens 85A located away from a left wall 812A and likely to have a lower temperature than a portion thereof near the left wall 812A. Thus, the heat release from the portion of the fθ lens 85A away from the left wall 812A can be appropriately reduced to reduce the temperature gradient of the fθ lens 85A in the direction of extension. Alternatively, as shown in FIG. 10, the interior of the heat-insulating room 50B may be separated into a plurality of subrooms 80DB. Also in this case, the individually separated heat-insulating subrooms restrict upward heat release from an fθ lens 85B and a fold mirror 86B.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An optical scanning device including:
   a housing including a first wall portion, a second wall portion intersecting with the first wall portion and extending in a main scanning direction of the laser light emitted from the laser light source, and a housing top directly mounted on top of the first and second wall portions;
   a laser light source configured to emit laser light;
   a polygon mirror disposed in an internal space defined by the housing, configured to be driven into rotation and deflect the laser light, thereby allowing the laser light to scan in the main scanning direction;
   a polygon motor configured to rotate the polygon mirror so that the mirror surfaces sequentially face the first wall portion and then face the second wall portion;
   an fθ lens disposed between the polygon motor and the second wall portion to extend in a the main scanning direction and configured to refract the laser light deflected by the polygon mirror; and
   a heat-insulating room insulating heat radiated from the internal space,
   wherein a recess is formed in the housing top above and along the fθ lens to extend in the main scanning direction and a standing wall is provided in the recess to partition the recess in the main scanning direction into a region close to the first wall portion and a region away from the first wall portion, and the heat-insulating room is formed by covering the region of the recess away from the first wall portion from above with a cover member put on the housing top.

2. The optical scanning device according to claim 1, further including a portion of the heat-insulating room corresponding to a bottom of the recess is in contact with a top surface of the fθ lens.

3. The optical scanning device according to claim 1, wherein safety standards relating to laser light of the laser light source are indicated on the cover member.

4. The optical scanning device according to claim 1, wherein the cover member is a porous elastic material.

5. The optical scanning device according to claim 1, wherein the cover member is a resin-made sheet material.

6. The optical scanning device according to claim 1, further including an extension extended from the first wall portion and having a distal end portion located between the polygon mirror and an end of the fθ lens located near the first wall portion.

7. The optical scanning device according to claim 1, further including
a fold mirror configured to reflect the laser light having passed through the fθ lens and guide the laser light to a photosensitive drum,
wherein the heat-insulating room is formed above and across both of the fθ lens and the fold mirror.

8. The optical scanning device according to claim 7, wherein the heat-insulating room is divided in a direction from a position of the fθ lens toward a position of the fold mirror to form a plurality of spaces extending in a direction of length of the heat-insulating room.

9. An image forming apparatus including:
an image carrier on a surface of which a toner image is to be formed;
a charging section configured to charge the surface of the image carrier;
an optical scanning device configured to expose the surface of the image carrier charged by the charging section to light to form an electrostatic latent image on the surface of the image carrier; and
a developing section configured to supply toner to the electrostatic latent image formed by the optical scanning device to form the toner image,
wherein the optical scanning device includes:
a housing including a first wall portion, a second wall portion intersecting with the first wall portion, and extending in a main scanning direction of the laser light emitted from the laser light source, and a housing top directly mounted on top of the first and second wall portions;
a laser light source configured to emit laser light;
a polygon mirror including a plurality of mirror surfaces, disposed in an internal space defined by the housing, and configured to be driven into rotation and deflect the laser light, thereby allowing the laser light to scan in the main scanning direction;
a polygon motor configured to rotate the polygon minor so that the mirror surfaces sequentially face the first wall portion and then face the second wall portion;
an fθ lens disposed between the polygon motor and the second wall portion to extend in the main scanning direction and configured to refract the laser light deflected by the polygon mirror; and
a heat-insulating room insulating heat radiated from the internal space,
a recess is formed in the housing top above and along the fθ lens to extend in the main scanning direction and a standing wall is provided in the recess to partition the recess in the main scanning direction into a region close to the first wall portion and a region away from the first wall portion, and
the heat-insulating room is formed by covering the region of the recess away from the first wall portion from above with a cover member put on the housing top.

10. The image forming apparatus according to claim 9, further including:
a housing having an installation space in which the optical scanning device is disposed;
an airflow generating device disposed in the housing and configured to allow airflow to enter the installation space; and
a cooling air passage configured to guide the airflow having entered the installation space to a portion of the housing top located above a portion of the fθ lens near the first wall portion.

11. The image forming apparatus according to claim 10, wherein the cooling air passage guides the airflow from the first wall portion toward the heat-insulating room.

* * * * *